No. 870,873. PATENTED NOV. 12, 1907.
L. G. FAGERSTEN.
COOKING UTENSIL.
APPLICATION FILED MAY 9, 1907.
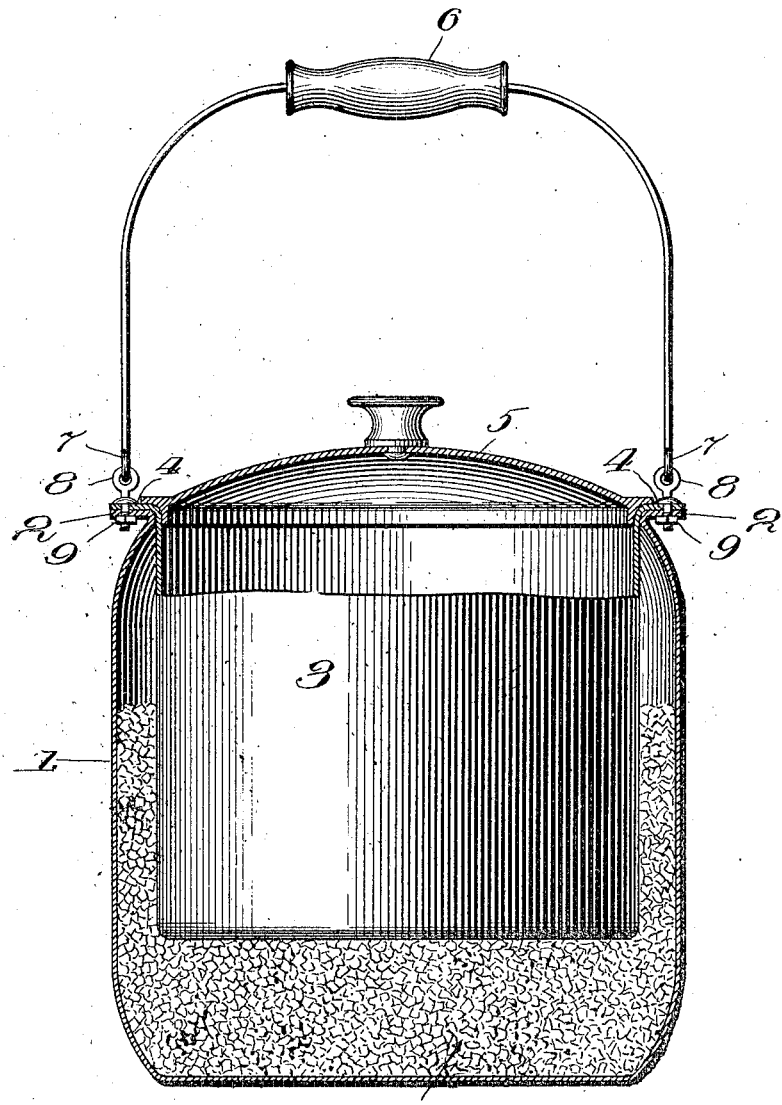
Mixture of Calcium Chloride & Zinc Chloride →10
Witnesses:
Harry L. Gaither
Ruby V. Nash.
Inventor:
Lorenzo G. Fagersten
by Walter N. Chamberlin
his Attorney

UNITED STATES PATENT OFFICE.

LORENZO G. FAGERSTEN, OF CHICAGO, ILLINOIS.

COOKING UTENSIL.

No. 870,873.      Specification of Letters Patent.      Patented Nov. 12, 1907.

Application filed May 9, 1907. Serial No. 372,716.

*To all whom it may concern:*

Be it known that I, LORENZO G. FAGERSTEN, a citizen of the United States, residing at Chicago, county of Cook, State of Illinois, have invented a certain new and useful Improvement in Cooking Utensils, and declare the following to be a full, clear, and exact description of the same, such as will enable others skilled in the art to which it pertains to make and use the same, reference being had to the accompanying drawings, which form a part of this specification.

My invention relates to the art of cooking food, and more particularly to a utensil wherein food may be initially heated and the cooking thereafter completed by means of the heat stored up in the utensil.

Various schemes have been proposed for preparing food in this manner, but no arrangement has heretofore been devised for conveniently and satisfactorily baking, roasting or frying foods, since the temperatures necessary for this purpose are quite high. It has been proposed to use a cooking utensil containing a body of water which is initially heated and then removed from the flame or other heating device and allowed to stand in order to let the heat stored up in the water act upon the food after the utensil has been removed from the influence of the source of heat. The temperature to which water may be heated at normal pressure is much below that which is necessary to effect roasting, frying or baking, and, in order to secure the requisite temperatures with water, it would be necessary to cause the water to boil under enormous pressure. It is evident that a utensil made strong enough to withstand the pressure of water boiling at 400 degrees F. or more would have to be made so heavy as to be entirely unsuited for use in an ordinary kitchen. If it is attempted to use metals of low melting points such as lead or alloys instead of water a high temperature at normal pressures may be obtained but the heat capacity of such metals is so low that the weight of a utensil having sufficient heat capacity to thoroughly bake, roast or fry food will be prohibitive.

The object of my invention is to provide a cooking utensil of the character described, wherein high degrees of temperature may be obtained without the use of dangerous pressures within the utensil and without making the utensil so heavy as to make it cumbersome.

A further object of my invention is to provide a utensil of the character described which shall be durable and which shall be so constructed that no care need be exercised in removing the food therefrom or during the washing of the utensil in order to prevent injury to the utensil or tainting of the food.

Further objects of my invention will appear from the following detailed description taken in connection with the accompanying drawing which is a longitudinal section of a utensil arranged in accordance with the preferred form of my invention.

Referring to the drawing, 1 indicates a pot or receptacle of any suitable size and shape having at its upper edge a laterally projecting flange 2. 3 is a receptacle smaller in size than the receptacle 1 having also a laterally projecting flange 4. The small receptacle is adapted to be inserted within the other end to be supported in the proper relation thereto by means of the engaging flanges. The flanges may be securely united in any convenient manner so that there is formed between the inner wall of the outer receptacle and the outer wall of the inner receptacle, a hermetically sealed space. The receptacles may be made of any suitable materials, such as are ordinarily employed in the manufacture of light cooking utensils and, if desired, the interior of the inner receptacle and the exterior of the outer receptacle may be covered with suitable enamel or other material which gives a hard smooth finish. It will be seen that the compound receptacle may be tilted or inverted, or it may be immersed in water without in any way endangering the contents within the space between the two members and without danger that the material within this space will get into food which is contained in or being removed from the inner receptacle.

In accordance with my invention I fill, or partially fill, the space between the two receptacles with some material 10 which shall be fairly light, which can be raised to a high degree of temperature without producing a high pressure in the inclosure and which shall have a high heat capacity so that when food is placed into the receptacle and is initially heated to a high temperature by any suitable source of heat supply, the completion of the cooking may be effected by the heat which is stored up in the utensil; so that the utensil may be removed from the source of heat supply and be allowed to stand until the food is entirely cooked.

I have found that excellent results may be obtained by using crystallized chemical compounds, preferably those which contain considerable water as water of crystallization. One of such substances is calcium chlorid, whose crystal composition is $CaCl_2 + 6H_2O$. This substance contains a large amount of water, as water of crystallization, and may be heated to fairly high temperatures without driving out any of the water. This substance melts at about 86 degrees F. so t it begins to take up large quantities of heat lo_ befo temperature is reached which endangers the utens the food contained therein. At a temperature of it 400 degrees F. a portion of the water is given o t nd therefore, in order to prevent the formation of steam pressure within the receptacle, I prefer to add a quantity of zinc chlorid which will combine with the water given off by the calcium chlorid. By this means a high degree of temperature may be maintained within the utensil without fear of the creation of dangerous pressures. Furthermore the heat capacity of the utensil is very high so that not only may high temperatures be safely obtained, but the final cooking may be thoroughly done after the apparatus is removed from the source of heat supply.

The utensil is preferably provided with a cover or lid 5 and with a bail, whereby it may be carried about. The bail may be attached in any suitable manner, as for example by means of hooks 7 at its ends which engage eyes 8 in two of the connecting screws 9 for the flanges.

It will now be seen that I have provided a light and compact utensil which may be conveniently handled and wherein food of any desired character may be cooked in any desired way without requiring any undue amount of attention on the part of the cook.

While I have described my invention as embodied in a preferred form, and have enumerated a specific material which can be used to advantage as the heat retainer, I do not desire to be limited to the particular construction shown or to the particular heat retaining material specified, since in its broader aspects my invention may be carried out in other forms as will be evident from the definitions comprised in the appended claims.

Having now fully described my invention, what I claim as new, and desire to secure by Letters Patent is:

1. In a cooking utensil, a food-containing receptacle, a jacket surrounding and secured to the food-containing receptacle in such a manner as to form a hermetically sealed inclosure about the food-containing receptacle, and a heat-storing material contained within said inclosure, said material having a high specific heat and being capable of being raised to a high temperature at normal pressure.

2. In a cooking utensil having a food containing space, a hermetically sealed inclosure surrounding said space, and a heat-storing material located in said inclosure, said heat storing material having a high specific heat and being capable of being raised to a temperature above the boiling point of water at normal pressure.

3. In a cooking utensil, a food-containing receptacle having a flange at its upper end, a larger receptacle also having a flange at the open end, means for securing said flanges together with the receptacles held in telescoped relation to each other, so as to form a hermetically sealed inclosure about the food-containing receptacle, and a heat-storing material contained within said inclosure, said material having a high specific heat and being capable of being raised to a temperature higher than the boiling point of water at normal pressure.

4. A cooking utensil having a food-containing space, a hermetically sealed inclosure surrounding said space, a heat-storing material located in said space, said material having a high specific heat and being capable of being raised to a temperature higher than the boiling point of water at normal pressure.

5. A cooking utensil having a food-containing space, a hermetically sealed inclosure surrounding said space, and a crystallized heat-storing material containing a large amount of water of crystallization arranged in said inclosure.

6. In a cooking utensil, a food-containing receptacle, a jacket surrounding it, and a solid hydrated crystallized heat-storing material located between said receptacle and jacket.

7. In a cooking utensil, a food-containing receptacle, a larger receptacle surrounding it, and a solid crystallized heat-storing material having a large amount of water of crystallization located between said receptacles.

8. In a cooking utensil, a food-containing receptacle, a larger receptacle surrounding it, and a quantity of calcium chlorid crystals, having a large amount of water of crystallization contained in the space between said receptacles.

9. A cooking utensil having a food-containing space, a hermetically sealed inclosure surrounding said space, and a crystallized heat-storing material containing a large amount of water of crystallization and having a low melting point arranged in said inclosure.

10. In a cooking utensil, a food containing receptacle; a larger receptacle surrounding it; and a crystallized heat-storing material arranged in a space between said receptacle; said heat storing material containing a large amount of water of crystallization, having a low melting point and being capable of being raised to a temperature above the boiling point of water without losing its water of crystallization.

11. In a cooking utensil, a food containing receptacle, a larger receptacle surrounding it, a quantity of calcium chlorid crystals containing water of crystallization and a quantity of zinc chlorid contained in the space between said receptacles.

12. A cooking utensil having a food containing space, a hermetically sealed inclosure surrounding said space, a crystallized heat storing material containing water in the form of water of crystallization arranged in said inclosure, and a quantity of deliquescent material also arranged within said inclosure.

In testimony whereof, I sign this specification in the presence of two witnesses.

LORENZO G. FAGERSTEN.

Witnesses:
 WM. F. FREUDENREICH,
 HARRY S. GAITHER.